United States Patent Office 2,719,911
Patented Oct. 4, 1955

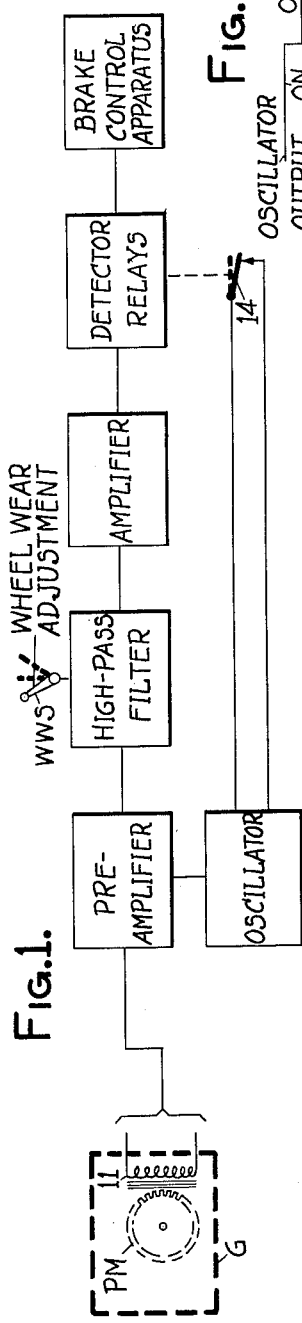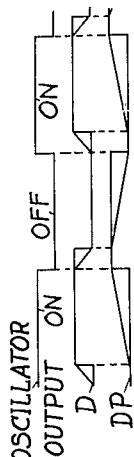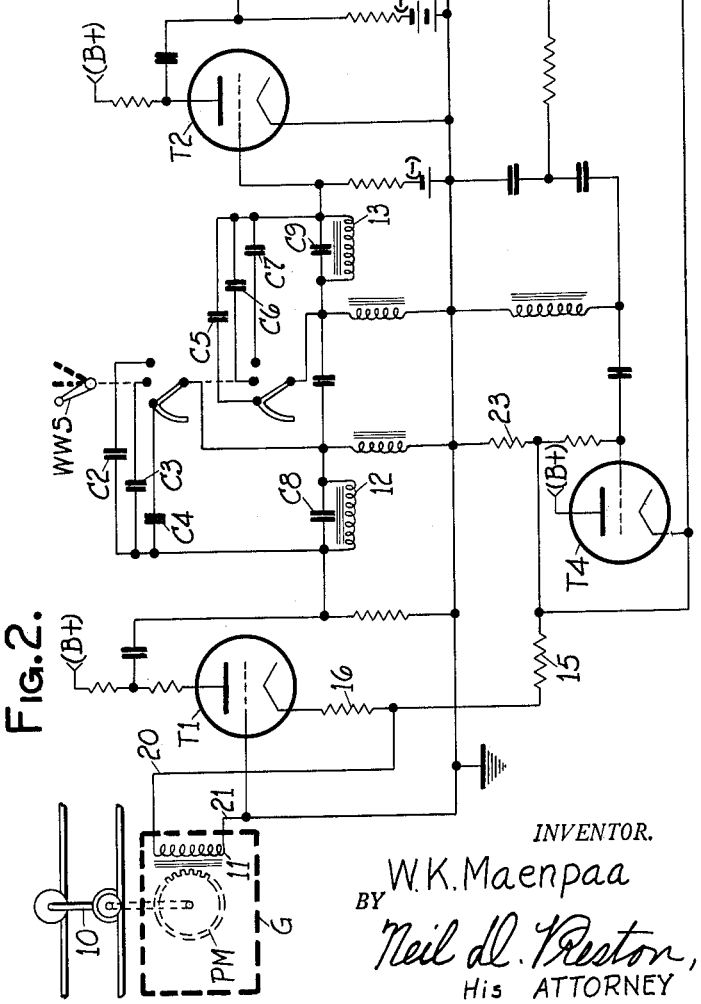

2,719,911

TRAIN SPEED CONTROL SYSTEM

Wilho K. Maenpaa, Rochester, N. Y., assignor to General Railway Signal Company, Rochester, N. Y.

Application May 22, 1952, Serial No. 289,389

11 Claims. (Cl. 246—182)

This invention relates to train speed control systems for railroads, and it more particularly pertains to systems of speed limit control employing frequency responsive apparatus.

In automatic train control systems, it has been common practice to employ a centrifuge speed contactor mounted on the journal box of a locomotive as a part of a train control system. In such case, the contactor is subject to severe vibration, and circuit selections through the respective contacts have to be made for several different circuits having wires extending from the other train control equipment at a point on the locomotive remote from the contactor.

Generally speaking, and without attempting to define the scope of the present invention, the present invention contemplates the driving by an axle of a locomotive of a frequency generator. The generator output is fed to apparatus at a remote point on the locomotive where it is used through suitable amplifier and filter stages to govern an electro-pneumatic valve so as to cause a service application of the brakes in case of excessive speeds in speed restricted territory.

Because of the circuits for the control of the electro-pneumatic valve involving safety, it is a requisite that the integrity of these circuits be checked. Thus continuity of the safety circuits is checked by a check system wherein energy is applied intermittently by an oscillator at a given frequency so long as the integrity of the speed control circuit organization is maintained, and a detector relay is required to be operated intermittently in response to the oscillator under normal conditions in order to prevent an automatic application of the brakes. The circuit for the control of the detector relay includes a high-pass filter, and the frequency of the oscillator is high enough to be passed by the filter; but the generated frequency of the axle driven generator is blocked by the filter until the locomotive reaches its maximum speed limit, at which time the pulsing of the detector relay ceases and the brakes are applied. By this organization the oscillator serves the dual purpose of checking and also providing energization to keep the detector relay active when the locomotive is stopped and there is no output of the axle driven frequency generator.

In order that energy may reach the detector relay, an intermediate amplifier stage must be conducting. This amplifier stage checks the continuity of a circuit connecting the output of the axle driven frequency generator with the amplifier, as the amplifier is rendered nonconducting whenever the resistance of the circuit connection to the generator is abnormally high or low, as would be the case for respective open and short circuit conditions. The failure of this amplifier stage to conduct will interrupt the pulsing of the detector relay, and thus cause automatic application of the brakes.

An object of the present invention is to check the integrity of all of the safety circuits involved in a frequency responsive control system, the integrity of the circuit connection to the axle driven frequency generator being checked by a normal conducting tube having requisites for its normal conduction based on the impedance of the circuit connection of the axle generator to the amplifier.

Another object of the present invention is to provide selective means for wheel wear compensation in a frequency responsive train speed control system.

Other objects, purposes, and characteristic features of the present invention will be in part obvious from the accompanying drawings, and in part pointed out as the description of the invention progresses.

In describing the invention in detail, reference is made to the accompanying drawing in which corresponding parts are identified by similar reference characters; and in which:

Fig. 1 is a block diagram illustrating the general organization of the train speed control system according to the present invention;

Fig. 2 illustrates the organization of a particular specific embodiment of the train speed control system provided by the present invention;

Fig. 3 is a sequence diagram illustrating the sequence of operations involved in the pulsing of the detector relay.

The illustrations employed in the disclosure of the present invention have been arranged to facilitate the disclosure as to the mode of operation and the principles involved, rather than for the purpose of illustrating the actual construction and arrangement of parts that would be employed in practice. Thus the various parts are illustrated by conventional symbols, the symbols (+) and (—) being employed to indicate connections to the respective positive and negative terminals respectively of suitable batteries or other sources of direct current, and the symbols (B+) and (Ground) being used to designate connections to a suitable high voltage direct current "B" supply for electronic tube circuits.

With reference to Figs. 1 and 2, an axle 10 of a locomotive is illustrated as having connected thereto a frequency generator G having a toothed permanent magnet rotor PM which is driven directly by the rotation of the axle 10. The rotation of the rotor PM of the generator G generates an alternating current in the winding 11 at a frequency proportional to the speed of the locomotive.

With reference to the block diagram of Fig. 1, the system comprises a pre-amplifier, a high-pass filter, an amplifier, detector relays, brake control apparatus, and an oscillator.

The control of the brakes of the locomotive is accomplished by the selective energization or deenergization of a conventional electro-pneumatic valve EPV (see Fig. 2), the structure of which is well known to those familiar with the art, and is more specifically disclosed, for example, in the patent to C. S. Bushnell, No. 1,855,596, dated April 29, 1932. The electro-pneumatic valve EPV is normally energized to permit the brakes of the train to be released, and is effective when deenergized to reduce the air pressure and thereby cause a service application of the brakes of the train.

The energization of the valve EPV is dependent upon a slow drop away relay C being in its picked up position. The relay C is energized only by the discharge of a suitable condenser C1.

Detector relays D and DP are provided for intermittently charging the condenser C1 when the locomotive is operated below its restricted speed limit, the relay DP being slow acting as indicated by the time-sequence diagram of Fig. 3.

The pre-amplifier comprises a tube T1 that is normally conducting, and is operated preferably as a class A amplifier.

Although different types of high-pass filters may be used, the filter employed according to Fig. 2 is a high-pass filter having tuned end sections 12 and 13 for the purpose of obtaining a high degree of selectivity at the lower limit of the pass-band. Supplementing the tuned end sections are suitable trimmer condensers C2, C3, C4, C5, C6, and C7, which are selectively included in the respective tuned end sections in accordance with the positioning of a suitable wheel wear compensating switch WWS.

Amplifier stages having tubes T2 and T3 are provided for amplifying the output of the high-pass filter sufficiently for the operation of the detector relays D and DP.

The oscillator, including tube T4, is of the resistance stabilizer type, but it is to be understood that other types of oscillators could be used.

Having thus considered the general organization of the apparatus according to the present invention, consideration will hereinafter be given as to the specific circuit organizations when considering the mode of operation of the system under certain typical operating conditions.

*Operation*

Under normal conditions, when power is applied to the system, and the locomotive is standing, or is in motion below its restricted speed limit, the amplifier tubes T1 and T2 are normally conducting, and the input to tube T1 is intermittently modulated by the output of the oscillator having tube T4. The tube T3 is biased to cutoff, and is rendered conductive for the energization of the detector relay D in response to modulation applied to the grid of the tube T3 by the output of the amplifier stage including tube T2. Under the assumed normal conditions, the frequency generated by the axle frequency generator G is not high enough to be passed by the high-pass filter, and thus only the frequency of the oscillator, which has been described as being above that of the high-pass filter, is effective to govern the energization of the detector relay D.

The output of the oscillator is provided only in accordance with the closure of the back contact 14 of relay DP, and thus the oscillator output is intermittently cut off upon the picking up of the slow acting relay DP according to the time-sequence charts of Fig. 3. The sequence of operation is that the relay D is first picked up in response to the oscillator frequency being applied to the cathode of the tube T1 through resistors 15 and 16; and the picking up of relay D, by the closure of its front contact 17 causes the picking up of the relay DP, after a time interval measured by the slow acting characteristics of relay DP. The picking up of this relay is effective by the opening of back contact 14 to cut off the output of the oscillator T4 and cause the relay D to be dropped away, and in dropping away to open the circuit for the repeater relay DP at front contact 17. In this way the system normally maintains a cycling operation wherein the relay DP is intermittently pumped.

The pumping of the contacts 18 and 19 of relay DP alternately charges the condenser C1 and discharges it through the winding of the slow acting relay C so that relay C is maintained steadily picked up to apply energy to the valve EPV, thus forestalling an automatic application of the brakes of the train.

Because of the oscillator frequency being required to be fed through the respective pre-amplifier high-pass filter and amplifier stages, the integrity is checked intermittently of the circuit organization for the energization of relay D.

It is further required that the integrity of the circuit be checked connecting through the winding 11 of the generator G from the cathode of the tube T1, to ground. It will be noted that this connection is not checked by continuity in a circuit including the frequency of the oscillator, but this circuit is checked by the reason of the pre-amplifier tube T1 being a grounded grid amplifier, so organized that a requisite for its normal conduction is that the connection of the cathode through the resistor 16 to ground, is required to be through the circuit from the cathode of the tube T1, including the winding 11 of the frequency generator G, and wires 20 and 21 extending to the axle driven generator, to ground. Should the winding 11 of generator G become short circuited, the input to the tube T1 from the oscillator would be directly connected to ground. With the input to the tube T1 grounded, there can be no output of the tube T3 for the energization of relay D, and therefore the relays D, DP, and C would become dropped away under these conditions, and the dropping away of relay C would be effective to deenergize the brake control valve EPV by the opening of front contact 22. Thus a failure wherein the winding 11 of the generator G would become short circuited is detected, and the failure would be on the side of safety because the valve EPV would be actuated.

Similarly, if the winding 11 of the axle generator G should become open circuited, the tube T1 would be rendered nonconductive because of the connection of the cathode to (B+) through resistor 15 and the oscillator tube T4. Although a circuit can be traced for connection of the cathode of tube T1 to ground through the oscillator, including the resistors 16, 15, and 23, this circuit is of such high resistance as to render the tube T1 substantially nonconducting, and thus cause the relays D, DP, and C to be dropped away so as to deenergize the valve EPV by the opening of front contact 22. It is therefore provided that the integrity of the connection through the generator to the pre-amplifier is checked in the input circuit of the tube T1 in such a manner that the tube T1 has substantially no input when there is either a substantial short or open circuit involving the connection of its input circuit through the generator winding 11 to ground.

Although generators producing different frequencies relative to the speed of the locomotive axle 10 can be employed, it has been found, for one embodiment of the present invention, that a suitable range of frequencies is provided where the frequency of the generator G varies 20 cycles per second for every one mile per hour change in speed of the locomotive. Thus at six miles per hour, the frequency of the generator G would be 120 cycles per second, and at 60 miles per hour the frequency generated would be 1200 cycles per second. Thus upon determining what the maximum speed limit should be, the high pass filter is selected as having its pass band start at a frequency equal to the frequency generated by the generator G at the maximum speed limit.

In accordance with this organization, when the maximum speed is reached, the detector relay D becomes steadily energized by the output of the generator G. This causes the relay DP to be maintained steadily picked up. When relay DP ceases to pulse, by reason of holding back contacts 18 and 19 open, no energy is applied to the relay C. After a time determined by the slow acting characteristics of relay C, relay C becomes dropped away, and in dropping away it opens the circuit for the valve EPV at front contact 22, the deenergization of which causes a service application of the brakes of the train.

Provision for adjustment for wheel wear is made by switch WWS, without requiring replacement of the high pass filter. With the switch WWS in the position illustrated, the pass band of the high pass filter starts with a particular predetermined frequency, and as the wheel driving the generator wears, compensation can be made by actuation of the switch WWS clockwise, one point for each predetermined increment of wheel wear. In this way, trimmer condensers C2, C3, and C4 are selectively connected in different multiple combinations with the condenser C8; and condensers C5, C6, and C7 are selectively connected in multiple with the condenser C9 so that the start of the pass band of the high pass filter is adjusted to higher frequencies for the respective increments of wheel wear. By this arrangement the increase in the starting frequency of the pass band compensates for the greater number of revolutions per mile of the axle 10 driving the generator G. In other words, greater wheel wear means a higher frequency must be generated by the generator G in order to steadily energize the detector relay D to cause the application of the brakes of the train.

According to the embodiment that has been described, there is no penalty provided for over-speed in that as soon as speed is reduced below the limit, the relays D and DP start to pulse, and the relay C is picked up to energize the valve EPV and release the brakes. It is to be understood, however, that penalty means and/or acknowledgment means may be provided in accordance with the requirements of practice to comply with various train operating practices of different railroads.

It is also to be understood that if the speed governer according to the present invention is used in connection with locomotive carried train control equipment responsive to wayside imposed speed restrictions, the actuation of a different relay for each different speed restriction can be made to selectively substitute a different band pass filter indicative of the particular speed limit to be imposed.

Having described a speed governing system for a locomotive as one embodiment of the present invention, it is desired to be understood that various modifications, adaptations, and alterations may be applied to the specific form shown according to the requirements of practice and within the scope of the present invention except as limited by the appending claims.

What I claim is:

1. A train speed control system having train carried equipment comprising in combination, an axle driven frequency generator, an electro-pneumatic valve effective when deenergized to cause the application of the brakes of the train, a condenser, a slow acting relay effective when picked up to cause the energization of said electro-pneumatic valve, an oscillator, a normally conducting amplifier, circuit means for connecting the output of said oscillator and the output of said generator separately to the input of said amplifier, said circuit means being effective to render the amplifier nonconducting in case of an open circuit in the connection to said generator, a high-pass filter, and electro-responsive means energized through said high-pass filter by the output of said amplifier and effective to intermittently charge said condenser and discharge it through the winding of said slow acting relay, said electro-responsive means being effective intermittently except when the output of said generator is at a frequency above the start of the pass band of said high-pass filter.

2. A train speed control system having train carried apparatus comprising in combination, an axle driven frequency generator, an electro-pneumatic valve effective when deenergized to cause application of the brakes of the train, a condenser, a slow acting relay effective when picked up to cause the energization of said electro-pneumatic valve, an oscillator, a normally conducting amplifier, circuit means for connecting the output of said oscillator and the output of said generator separately to the input of said amplifier, said circuit means being effective to ground the output of said oscillator in case the output of said generator is short circuited, a high-pass filter, and electro-responsive means energized through said high-pass filter by the output of said amplifier and effective to intermittently charge said condenser and discharge said condenser through the winding of said slow acting relay, said electro-responsive means being intermittently effective except when the frequency of said generator exceeds the frequency of the start of the pass band of said high-pass filter.

3. A train speed control system having train carried equipment comprising in combination, an axle driven frequency generator, train braking apparatus including an electro-pneumatic valve effective when deenergized to cause application of the brakes of the train, a condenser, a slow acting relay effective when picked up to cause the energization of said electro-pneumatic valve, an oscillator, a normally conducting grounded grid amplifier, circuit means for connecting the output of said oscillator and the output of said generator separately to the input of said amplifier, said circuit means being effective to render the output of said oscillator ineffective in case the output of said generator is short circuited, a high-pass filter, and electro-responsive means energized through said high-pass filter by the output of said amplifier and effective to intermittently charge said condenser and discharge said condenser through the winding of said slow acting relay, said electro-responsive means being operable intermittently except when the frequency of said generator exceeds the start of the pass band of said high-pass filter.

4. A train speed control system having train carried equipment comprising in combination, an axle driven frequency generator, an electro-pneumatic valve effective when deenergized to cause application of the brakes of the train, a condenser, a slow acting relay effective when picked up to cause the energization of said electro-pneumatic valve, a normally conducting amplifier, circuit means for connecting the output of said oscillator and the output of said generator separately to the input of said amplifier, a high-pass filter, and electro-responsive means energized through said high-pass filter by the output of said amplifier and effective to intermittently charge said condenser and discharge said condenser through the winding of said slow acting relay, said electro-responsive means being intermittently operable except when the frequency of said generator exceeds the frequency of the start band of said high-pass filter, said circuit means being effective to prevent the intermittent charge and discharge of said condenser in case the output of said generator is short circuited.

5. A train speed control system having train carried equipment comprising in combination, an axle driven frequency generator, an electro-pneumatic valve effective when deenergized to cause application of the brakes of the train, a condenser, a slow acting relay effective when picked up to cause the energization of said electro-pneumatic valve, an oscillator, a normally conducting amplifier, circuit means for connecting the output of said oscillator and the output of said generator separately to the input of said amplifier, a high-pass filter, and electro-responsive means energized through said high-pass filter by the output of said amplifier and effective to intermittently charge said condenser and discharge said condenser through the winding of said slow acting relay except when the output of said generator is at a frequency above the start of the pass band of said high-pass filter, said circuit means being effective to prevent the intermittent charge and discharge of said condenser in case the output of said generator is open circuited in its connection to the input of said amplifier.

6. A train speed control system having train carried equipment comprising in combination, an axle driven frequency generator, brake control apparatus including an electro-pneumatic valve effective when deenergized to cause the application of the brakes of the train, a condenser, a slow acting relay effective when picked up to cause the energization of said electro-pneumatic valve, an oscillator, a pre-amplifier and an amplifier, said pre-amplifier being normally conducting and having its input circuit connected to the output of said generator and to the output of said oscillator separately, a high-pass filter connected to the output of said pre-amplifier and to the input of said amplifier, and electro-responsive means energized by the output of said amplifier and effective to intermittently charge said condenser and discharge said condenser through the winding of said slow acting relay, said electro-responsive means being effective to intermittently charge and discharge said condenser only provided that the frequency generated by said frequency generator is below the start of the pass band of said high-pass filter.

7. A train speed control system having train carried equipment comprising in combination, an axle driven frequency generator, an electro-pneumatic valve effective when deenergized to cause the application of the brakes of the train, a condenser, a slow acting relay effective when picked up to cause the energization of said electro-pneumatic valve, an oscillator, an amplifier having its input circuit connected to the output of said generator and also connected separately to the output of said oscillator whereby no alternating current input is applied to said amplifier in case said connection to the output of said generator is open or short circuited, a high-pass filter, and electro-responsive means energized through said high-pass filter by the output of said amplifier and effective to intermittently selectively charge said condenser and discharge said condenser through the winding of said slow acting relay whereby the intermittent operation of said electro-responsive means is required in order to maintain said electro-pneumatic valve energized.

8. A train speed control system having train carried equipment comprising, brake control apparatus having an electro-pneumatic valve effective when deenergized to cause application of the brakes of the train, a slow acting relay effective when picked up to cause the energization of said electro-pneumatic valve, an oscillator normally delivering an output intermittently, a normally conducting amplifier, circuit means for connecting the output of said generator and the output of said oscillator separately to the input of said amplifier, said circuit means being effective to render said amplifier nonconducting in case of an open circuit in the connection of the output of said generator to the input of said amplifier, a high-pass filter, an electro-responsive means for energizing said slow acting relay only in accordance with intermittent energization by the output of said amplifier feeding through said high-pass filter, whereby said slow acting relay is normally maintained picked up, but is dropped away upon the frequency of the frequency generator exceeding the start of the pass band of the high-pass filter.

9. A train control system having train carried apparatus comprising in combination, an axle driven frequency generator, an electro-pneumatic valve effective when deenergized to cause application of the brakes of the train, a condenser, a slow acting relay effective when picked up to cause the energization of said electro-pneumatic valve, said slow acting relay being normally dependent upon energization by the intermittent discharge of said condenser, a high-pass filter having manually operable means for selectively varying the start of its pass band, an oscillator effective to generate a given frequency within the pass band of said high pass filter, a two position control relay having contacts effective in one position of the relay to charge said condenser and contacts effective in the other position of the relay to discharge said condenser through the winding of said slow acting relay, and electro-responsive for intermittently energizing said two position control relay from the output of said oscillator through said high pass filter and thereby maintain said electropneumatic valve energization, said electro-responsive means being effective to steadily energize said two position control relay from the output of said generator when the frequency of said generator is above the start of the pass band of said high-pass filter and thereby cause the actuation of said electro-pneumatic valve to apply the brakes of the train.

10. A train speed control system having train carried equipment comprising in combination, a multiple position wheel wear compensating manual control switch, an axle driven frequency generator, an electro-pneumatic valve effective when deenergized to cause application of the brakes of the train, a condenser, a slow acting relay effective when picked up to cause the energization of said electro-pneumatic valve, said slow acting relay being subject to energization principally by the discharge of said condenser, a high-pass filter having the start of its pass band variable in a narrow frequency range in accordance with the positioning of said wheel wear compensating switch, an oscillator effective to generate a given frequency within the pass band of said high-pass filter, electro-responsive means intermittently operated in response to the output of said oscillator and effective when operated to charge said condenser, said electro-responsive means being subject to steady energization by the output of said generator feeding through said high-pass filter when the frequency of said generator is above the start of the pass band of said high-pass filter and thereby cause the cessation of the intermittent operation of said electro-responsive means whereby said electro-pneumatic valve is actuated when the frequency output of said generator is above the start of the pass band of said high-pass filter to apply the brakes of the train.

11. A train speed control system having train carried equipment comprising in combination, an axle driven frequency generator, an electropneumatic valve effective when deenergized to cause the application of the brakes of the train, a slow acting relay effective when picked up to cause the energization of said electropneumatic valve, an oscillator, a normally conducting grounded grid amplifier, circuit means for separately connecting the output of said generator and the output of said oscillator to the input of said amplifier whereby the short or open circuiting of the connection of said generator to the input of said normally conducting amplifier renders said amplifier nonconducting and the short circuiting of the connection of said generator short circuits the connection of the oscillator to the amplifier, a high pass filter, a condenser, and electro-responsive means energized through said high pass filter by the output of said amplifier effective normally to intermittently alternately charge said condenser and cause its discharge through the windings of said slow acting relay.

References Cited in the file of this patent
UNITED STATES PATENTS

| | | |
|---|---|---|
| 1,871,404 | Brown | Aug. 9, 1932 |
| 2,222,801 | Logan | Nov. 26, 1940 |
| 2,427,175 | Young | Sept. 9, 1947 |
| 2,558,445 | Laurenson | June 26, 1951 |